(12) United States Patent
Datar et al.

(10) Patent No.: US 8,612,460 B1
(45) Date of Patent: *Dec. 17, 2013

(54) CONTENT ENTITY MANAGEMENT

(75) Inventors: Mayur Datar, Santa Clara, CA (US); Ashutosh Garg, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,963

(22) Filed: May 7, 2012

Related U.S. Application Data

(63) Continuation of application No. 11/691,624, filed on Mar. 27, 2007, now Pat. No. 8,176,055.

(51) Int. Cl.
*G06F 7/00* (2006.01)
*G06F 17/30* (2006.01)

(52) U.S. Cl.
USPC ............................ 707/754; 707/757; 707/913

(58) Field of Classification Search
USPC ............................ 707/754, 999.001–999.005
See application file for complete search history.

(56) References Cited

U.S. PATENT DOCUMENTS

| | | | |
|---|---|---|---|
| 5,566,291 A | 10/1996 | Boulton et al. | |
| 6,286,006 B1 | 9/2001 | Bharat | |
| 6,718,258 B1 | 4/2004 | Barton | |
| 7,533,090 B2 | 5/2009 | Agarwal | |
| 7,904,473 B2 | 3/2011 | Damick et al. | |
| 8,176,055 B1 | 5/2012 | Datar et al. | |
| 2003/0225763 A1 | 12/2003 | Guilak | |
| 2004/0098405 A1* | 5/2004 | Zrubek et al. | 707/103 R |
| 2004/0215606 A1 | 10/2004 | Cossock | |
| 2005/0071741 A1* | 3/2005 | Acharya et al. | 715/500 |
| 2005/0223002 A1 | 10/2005 | Agarwal et al. | |
| 2006/0259493 A1* | 11/2006 | Liang | 707/10 |
| 2006/0271526 A1 | 11/2006 | Charnock | |
| 2006/0294311 A1 | 12/2006 | Fu | |
| 2007/0005568 A1 | 1/2007 | Angelo | |
| 2007/0033168 A1 | 2/2007 | Minogue | |
| 2007/0073894 A1* | 3/2007 | Erickson et al. | 709/230 |
| 2007/0112738 A1 | 5/2007 | Livaditis | |
| 2007/0112758 A1 | 5/2007 | Livaditis | |
| 2007/0192310 A1 | 8/2007 | Takagi | |
| 2007/0219958 A1 | 9/2007 | Park et al. | |
| 2007/0239684 A1* | 10/2007 | Anderson et al. | 707/3 |
| 2007/0260597 A1* | 11/2007 | Cramer | 707/5 |
| 2007/0266023 A1 | 11/2007 | McAllister et al. | |
| 2007/0288518 A1 | 12/2007 | Crigler | |
| 2008/0059891 A1* | 3/2008 | Herzog | 715/751 |
| 2008/0091549 A1* | 4/2008 | Chang et al. | 705/26 |
| 2008/0162265 A1* | 7/2008 | Sundaresan et al. | 705/10 |

OTHER PUBLICATIONS

"ESP game," Wikipedia, http://en.widipedia.org/wiki/ESP_game, 3 pages, Dec. 2009.

(Continued)

*Primary Examiner* — Kannan Shanmugasundaram
(74) *Attorney, Agent, or Firm* — Fish & Richardson P.C.

(57) ABSTRACT

A first content entity and one or more associated second content entities are presented to one or more arbiters. Arbiter determinations relating to the association of at least one of the second content entities with the first content entity are received. A determination as to whether the at least one of the second content entities is to be disassociated from the first content entity based on the arbiter determinations can be made.

16 Claims, 9 Drawing Sheets

(56) References Cited

OTHER PUBLICATIONS

International Search Report and the Written Opinion of the corresponding PCT application No. PCT/US2008/073914, Jun. 23, 2009, 12 pages.

Official Journal EPO, Notice from the European Patent Office, Oct. 1, 2007 concerning business methods, Nov. 2007, XP002498048, 2 pages.

von Ahn and Dabbish, "Labeling Images with a Computer Game," *CHI 2004*, Apr. 24-29, 2004, Vienna, Austria, 8 pages.

* cited by examiner

CONTENT ENTITY MANAGEMENT

CROSS-REFERENCE TO RELATED APPLICATIONS

Under 35 U.S.C. §120, this application claims benefit of the earlier filing date of pending U.S. patent application Ser. No. 11/691,624, filed on Mar. 27, 2007, the entire contents of which are hereby incorporated by reference.

BACKGROUND

This disclosure relates to content management.

A first content entity, e.g., a video and/or audio file, a web page for a particular subject or subject environment, a search query, a news article, etc., can have one or more associated second content entities, e.g., user ratings, reviews, tags, links to other web pages, a collection of search results based on a search query, links to file downloads, etc. The second content entities can, for example, be associated with the first content entity by a user input or by a relevance determination. For example, a user may associate a review with a video file on a web site, or a search engine may identify search results based on a search query.

Frequently, however, the second content entities associated with the first content entity may not be relevant to the first content entity, and/or may be inappropriate, and/or may otherwise not be properly associated with the first content entity. For example, instead of providing a review of a product or video, users may include links to spam sites in the review text, or may include profanity, and/or other irrelevant or inappropriate content. Likewise, users can, for example, manipulate results of search engines or serving engines by artificially weighting a second content entity to influence the ranking of the second content entity. For example, the rank of a web page may be manipulated by creating multiple pages that link to the page using a common anchor text.

SUMMARY

Disclosed herein are systems and methods of content entity management. In an implementation, a first content entity and one or more associated second content entities are presented to two or more arbiters. Arbiter determinations relating to the association of at least one of the second content entities associated with the first content entity are received. Based on the received determinations, a determination as to whether the at least one of the second content entities is to be disassociated from the first content entity can be made.

In another implementation, a first content entity and one or more associated second content entities are identified and presented to one or more reviewers. An association score for each of the one or more second content entities is determined, and determinations relating to the association of at least one of the second content entities with the first content entity are received from the reviewers. A determination as to whether at least one of the second content entities is to be disassociated from the first content entity can be made based on the one or more reviewer determinations and the association score of the at least one of the second content entities.

In another implementation, a system includes a data store storing a first content entity and content processing instructions. The content processing instructions are executable by a processing subsystem and can cause the processing subsystem to identify one or more second content entities associated with the first content entity, present one or more second content entities associated with the first content entity to two or more arbiters and receive arbiter determinations relating to the association of at least one of the second content entities with the first content entity. A determination to disassociate the least one of the second content entities from the first content entity can be made based on the arbiter determinations.

DETAILED DESCRIPTION

Figure 1:
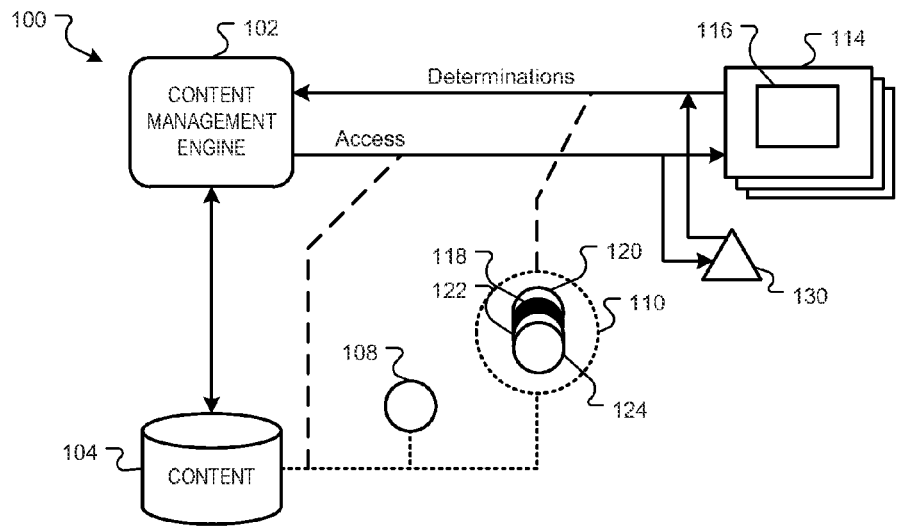
FIG. 1 is a block diagram of an example content management system.

FIG. 1 is a block diagram of an example content management system 100. The content management system 100, can, for example, be implemented in a computer device or more than one computer devices connected through a network (e.g., a local area network (LAN) or the Internet). In some implementations, the content management system 100 can identify and present a first content entity and at least one second content entity to two or more arbiters to determine whether the second content entity is to be disassociated from the first content entity.

The content management system 100 can, for example, include a content management engine 102 and a content data store 104. In one implementation, the content management engine 102 can be implemented in a processing subsystem of a computing device capable of executing content processing instructions. The computing device can, for example, include a memory device storing the content processing instructions and a processing device for executing the content processing instructions. An example computing system is shown and described with reference to FIG. 16. Other implementations, however, can also be used.

In one implementation, the content data store 104 can comprise a unitary data store, such as a hard drive. In another implementation, the content data store 104 can comprise a distributed data store, such as a storage system that is distributed over a network. Other implementations, however, can also be used.

The content management engine 102 can, for example, identify and disassociate second content entities from a first content entity. In one implementation, the content data store 104 stores a first content entity 108 and second content entities 110 e.g., content entities 118, 120, 122 and 124, that are associated with the first content entity 108. Alternatively, the content data store 124 can only store links or pointers to the one or more second content entities 110.

Different types of first and second content entities 108 and 110 can be associated. In one implementation, the first content entity 108 can, for example, represent an item offered for sale in an online retail store, and the second content entities 110 can be a set of user comments related to the item. In another implementation, the first content entity 108 can be a journal entry of an online journal (e.g., a blog), and the second content entities 110 can be readers' comments of the journal entry. In another implementation, the first content entity 108 can be a media file (e.g., an image or a video clip), and the second content entities 110 can be annotations (e.g., description or comments) of the media file. In another implementation, the first content entity 108 can be a search query for a search engine, and the second content entities 110 can be search results for the search query. Other types of first and second content entities 108 and 110 can also be used.

The content data store 104 can store other first content entities 108 and second content entities 110. Additionally, the second content entities 110 can define a subset of all second content entities associated with the first content entity 108; e.g., the second content entities 110 can define a subset of four movie reviews 118, 120, 122 and 124 from a set of thirty movie reviews related to a movie content entity 108.

In some implementations, the content management system 100 can identify and present one or more of the second content entities 110 with the associated first content entity 108 to two or more arbiters. In this example implementation, the content management engine 102 can provide access to one or more of the second content entities 110 and the associated first content entity 108 to two or more client devices 114, e.g., computer devices connected to the system 100 over a network. For example, the content management engine 102 can retrieve the one or more of the second content entities 110 and the associated first content entity 108 from the data store 104 and present the content entities 108 and 110 to the client devices 114.

In some implementations, the client devices 114 can, for example, include presentation engines 116 for presenting the first and second content entities 108 and 110 to arbiters. Example presentation engines 116 include applets, such as a Java applet; web browsers; or other executable engines or software. The arbiters can determine whether one or more of the second content entities 110 are to be disassociated with the first content entity 108. For example, each of the client devices 114 can include a browser for accessing the content entities provided by the content management system 100. The browser can, for example, provide a graphical user interface (GUI) to the arbiters so that the arbiters can determine whether at least one of the second content entities 110 should be disassociated with the first content entity. The content management engine 102 can determine whether any of the second content entities 110 is to be disassociated based on the arbiter determinations received.

In one implementation, human arbiters (or reviewers) can review the first content entity and determine whether at least one of the presented second content entities 110 is to be disassociated from the first content entity 108. For example, the first content entity 108 may be an image of Mount Fuji and the second content entities 110 may be annotations of the image, such as "Kilimanjaro," "Japanese mountain," "Japan," "Scenic Japan." The content management engine 102 may present the image and the annotations to the client devices 114. The client devices 114 facilitate arbiter review of the associations and for determining whether at least one of the annotations is to be disassociated from the image, e.g., the annotation "Kilimanjaro" would likely be disassociated from the image based on arbiter reviews.

After receiving determinations from the client devices 114, the content management engine 102 can determine, based on the received determinations, whether at least one of the second content entities 110 is to be disassociated from the first content entity 108. In one implementation, the content management engine 102 may determine that a second content entity 118, e.g., "Kilimanjaro," is to be disassociated if a simple majority of the arbiter determinations indicate that the second content entity 118 is to be disassociated. For example, if the content entities 118, 120, 122 and 124 are presented to three arbiters, and the content entity 118 is the subject of two determinations of disassociation while the content entity 120 is the subject of one determination of association, then the second content entity 118 will be disassociated from the first content entity 108. In another implementation, the content management engine 102 can determine to disassociate the second content entity 118 only if the arbiter determinations unanimously indicate that the annotation is to be disassociated other voting schemes can also be used.

In an implementation, the content management engine 102 can set a time limit for the reviewers to respond to the presented content entities 108 and 110. For example, the content management engine 102 may set the time limit beyond which no arbiter determination is to be received. In one implementation, the content management engine 102 can determine to disassociate the second content entity 118 only if the arbiter determinations received before the expiration of the time limit unanimously indicate that the annotation is to be disassociated. In another implementation, the content management engine 102 can determine to disassociate the second content entity 118 if a majority of arbiter determinations received before the expiration of the time limit indicate that the annotation is to be disassociated. In another implementation, the content management engine 102 can determine to disassociate the second content entity 118 if a threshold number of arbiter determinations received before the expiration of the time limit indicate that the annotation is to be disassociated. Other determination schemes can also be used.

In some implementations, an arbiter can be implemented as a software agent 130. For example, the software agent 130 can implement algorithms to evaluate the second content entities 110 in relation to the first content entity 108, e.g., the software agent 130 can determine whether at least one of the second content entities 110 is to be disassociated with the first content entity 108. In an implementation, the software agent 130 can implement algorithms to determine a relevance measure for each of the second content entities 110 to the first content entity 108, e.g., based on a comparison of text in the second content entities 110 to text of the first content entity 108. The software agent 130 can, for example, determine to disassociate second content entities 110 have a relevance measure less than a threshold. In another implementation, the software agent 130 can implement algorithms to identify inappropriate annotations to be disassociated, e.g., algorithms that identify profanity or textual patterns that are substantially similar to the text of profane words. Other algorithms to determine whether a second content entity should be disengaged with a first content entity can also be used.

In one implementation, a software agent 130 can be invoked if a single human arbiter desires to determine whether one or more of the second content entities 110 are to be disassociated with a first content entity 108, and if no other human arbiters are present. In another implementation, a software agent 130 can invoked even if more than one human arbiter is present. Other software agent 130 participation schemes can also be used.

In one implementation, the content management engine 102 can randomly select the arbiters. In another implementation, the arbiters can determine whether one or more of the second content entities 110 are to be disassociated with a first content entity 108 in a blind context. For example, the arbiters can participate on client devices 114 communicating over the Internet and without knowledge of each other arbiter's determinations and/or identity.

In another implementation, the content management engine 102 can select the arbiters based on an arbiter characteristic, e.g., an arbiter's level of reviewing experience, an arbiter's accuracy in selecting content items that are eventually disassociated; an arbiter's familiarity with a particular field of a content item, or some other characteristic. Such selection-based schemes can, for example, be applied to both human arbiters and agent arbiters.

In another implementation, the content management engine 102 can select the arbiters based on an arbiter relationship with a first content entity 108. For example, a copyright owner of a content entity 108 may be provided exclusive rights for the copyright owner's employees to review ratings for the first content entity 108. In another implementation, the content management engine 102 can select the arbiters based on an arbiter location. For example, arbiters in the San Francisco area may be more often selected to review comments related to a video of local landmark, e.g., the Golden Gate Bridge. Other arbiter selection schemes can also be used, e.g., credit balances, invitations and/or selections when an arbiter "buddy" is online, etc.

In another implementation, arbiter determinations previously obtained from arbiters can be presented to arbiters that are currently considering disassociation. In one example implementation, arbiters can also provide a rationale for disassociation. The rationale can, for example, be predefined, e.g., check boxes for categories such as "Obscene," "Unrelated," "Spam," "Unintelligible," etc. Alternatively, the rationale can be subjective, e.g., a text field can be provided which an arbiter can provide reasons for an arbiter determination. The rationale can, for example, be reviewed by administrators for acceptance of a determination, or to tune arbiter agents, etc. In another implementation, the rational provided by the two or more arbiters must also match, or be substantially similar, before the second content entity 110 is disassociated from the first content entity 108.

In another implementation, the arbiters can determine whether one or more of the second content entities 110 are to be disassociated with a first content entity 108 in real time. For example, the content management engine 102 may present the second content entities 110 with the associated first content entity 108 to two or more arbiters at substantially the same time and the arbiters may be required to submit determinations within a substantially same time period. In an implementation, the content management engine 102 can, for example, set the same time limit for each arbiter, e.g., the arbiters can be required to submit determinations within fifteen seconds after the content entities 108 and 110 are presented.

In another implementation, the arbiters can determine whether one or more of the second content entities 110 are to be disassociated with a first content entity 108 at different times. For example, the content management engine 102 may present the second content entities 110 with the associated first content entity 108 to each of the arbiters at different times, e.g., based on an indication that an arbiter desires to review a set of content entities 108 and 110. After receiving an arbiter determination, the content management engine 102 can buffer the arbiter determination in, for example, a memory device. In one implementation, the content management engine 102 can buffer determinations until a predetermined number of the arbiter determinations are received. In another implementation, the content management engine 102 can buffer determinations until a statistically significant number of arbiter determinations are received, e.g., 50%, 75%, 80%, 90%, or some other statistically significant portion of a predetermined number of determinations. Based on the buffered arbiter determinations, the content management engine 102 can determine whether one or more of the second content entities 110 are to be disassociated.

In some implementations, the content management engine 102 may award credits to an account of an arbiter upon disassociation of one of the second content entities 110. For example, the content management engine 102 can award credits to an arbiter account if the arbiter determined that a second content entity, e.g., content entity 118, should be disassociated with a first content entity 108, and if the second content entity is disassociated based on the received determinations.

In another implementation, arbiters can, for example, be allowed to associate a second content entity with the first content entity after providing an arbiter determination. For example, the ability to provide a product review can be predicated on reviewing a sample of existing reviews to ensure that existing reviews are appropriate and/or identify an existing review that should be disassociated.

Figure 2:
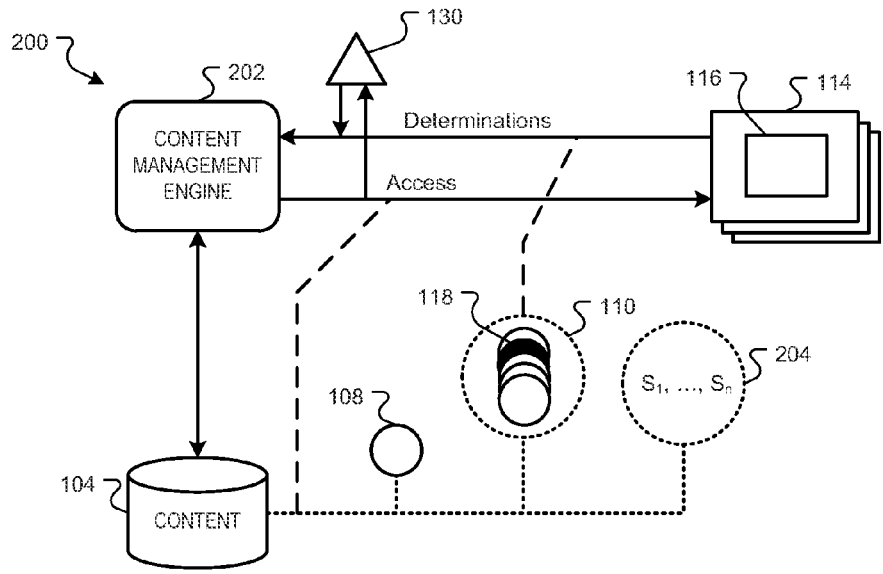
FIG. 2 is a block diagram of another example content management system.

FIG. 2 is a block diagram of another example content management system 200. The content management system 200 includes a content management engine 202 and the content data store 104. In the depicted example, the content management engine 202 can determine association scores 204 for each of the second content entities 110. In one implementation, the association scores can be used to determine whether a second content entity is to be presented with a first content entity to an arbiter.

In an implementation, content management engine 202 can, for example, determine the association scores 204 for the second content entities 110 based on the content of the second content entities 110 and the content of the first content entities 108. In one implementation, the content management engine 202 can determine the association score 204 by searching for one or more phenomena in the second content entities 110. For example, the content management engine 202 may assign the association score 204 based on a low relevancy score, a high rank freshness, a predetermined textual pattern, and/or some other phenomena.

In one implementation, the content management engine 202 can implement algorithms to generate the association scores 204 based on identifications of the phenomena. The content management engine 202 can generate the association scores 204 for the second content entities 110 in substantially inverse proportion to identifications of the phenomena, e.g., second content entities having many predetermined textual patters (e.g., text of profanity) can be assigned a low association score.

In an implementation, the content management engine 202 can, for example, search the second content entities 110 for irrelevant content with respect to the associated first content entity 108. If, for example, the content management engine 202 identifies irrelevant content in the second content entity 118, the content management engine 204 can assign a low association score corresponding to the second content entity 118. For example, the content management engine 202 may assign a low association score to a comment associated with an article about the C++ programming language if the comment is determined to be related to a web site related to real estate marketing.

In another example, the content management engine 202 can, for example, search the second content entities 110 for a ranking freshness associated with each of the second content entities 110. For example, the first content entity 108 can comprise a search query and the second content entities 110 can comprise search results for the query. The search results can include a rank that can, for example, relate to a presentation position, a relative measure of importance, or some other ranking. The rank can also be measured by a rank freshness parameter that indicates whether the rank has recently changed. Accordingly, a high rank coupled with a high rank freshness may indicate an artificial manipulation of the search result. In one implementation, the content management engine 202 can assign a relatively low association score to a second content entity if a rank of the second content entity has suddenly increased to a very high rank.

In one implementation, the content management engine 202 can, for example, search for a textual pattern in the second content entities 110. For example, the content management engine 202 can search for a list of objectionable words or phrases in the second content entities 110, e.g., words or phrases related to profanity or pornography. The content management engine 202 can assign a low association score to the second content entities that include the objectionable words or phrases. In another implementation, the content management engine 202 can search for the objectionable words or phrases as well as close alternatives of the objectionable words or phrases, e.g., a word similar to an objectionable word, having a 'v' substituted for a 'u' in the objectionable word.

In another implementation, the content management engine 202 can, for example, search for one or more specific formats in the second content entities 110. For example, the specific formats may indicate a higher probability of a spam annotation. For example, the content management engine 202 can search for predetermined uniform resource locators (URLs) in the second content entities 110. If the content management engine 202 identifies a predetermined URL a second content entities 110, the content management engine 202 can assign a low association score to the one second content entities 110.

In an implementation, the content management engine 202 can identify the second content entities to be presented based on the association scores 204. For example, the content management engine 202 can, present second content entities 110 having association scores 204 less than an association score threshold. In another implementation, the content management engine 202 can be configured to present second content entities 110 having lower association scores 204 more frequently than second content entities 110 having higher association scores.

In another implementation, the content management engine 202 can be configured to present the second content entities 110 with relatively low association scores 204 in the presence of second content entities 110 with relatively high association scores 204. For example, the content management engine 202 may include a high threshold and a low threshold. In one implementation, the content management engine 202 may be configured to present second content entities 110 having association scores 204 that exceed either the high threshold or that are less than the low threshold. By presenting what is likely an irrelevant and/or objectionable second content entity in the presence of highly relevant and/or acceptable content entities, the accuracy of arbiter determinations may be increased. In one implementation, as the quantity of and/or the overall association scores of the remaining second content entities change, the high and low thresholds may likewise be lowered and increased, respectively. In another implementation, a percentage, e.g., 10% or some other fraction, of both the top association scored content entities 110 and the low association scored content entities can be presented. Other presentation selection schemes can also be used.

In another implementation, the content management engine 202 can determine whether the second content entity 118 is to be disassociated based on both the arbiter determinations and the association score 204. For example, the content management engine 202 can determine to disassociate the second content entity 118 if the association score 204 of the second content entity 118 is low and a corresponding number of arbiter determinations, e.g., one, two, five, a majority, etc., indicate that the second content entity 118 is to be disassociated. In an implementation, the association score 204 can, for example, be determinative of the corresponding number of arbiter determinations required to disassociate the second content entity 118. Table 1 below provides an example relation between a normalized association score and a corresponding number of arbiter determinations required to disassociate a second content entity from a first content entity. Other relations can also be used.

TABLE 1

| NORMALIZED ASSOCIATION SCORE | DISASSOCIATION DETERMINATIONS REQUIRED |
| --- | --- |
| >0.3 | 100% |
| 0.2-0.3 | >75% |
| 0.1-0.2 | >66% |
| <0.1 | >50% |

In another implementation, the content management engine 202 can combine the association score 204 and the received arbiter determinations to generate a combined score. Using the combined score, the content management engine 202 can determine whether one or more second content entities 110 is to be disassociated. For example, the content management engine 202 may determine that at least one of the second content entities 110 is to be disassociated if the combined score exceeds a predetermined threshold.

Other schemes for determining whether a second content entity is to be disassociated from a first content entity based on an association score and arbiter or review determinations can also be used.

Figure 3:
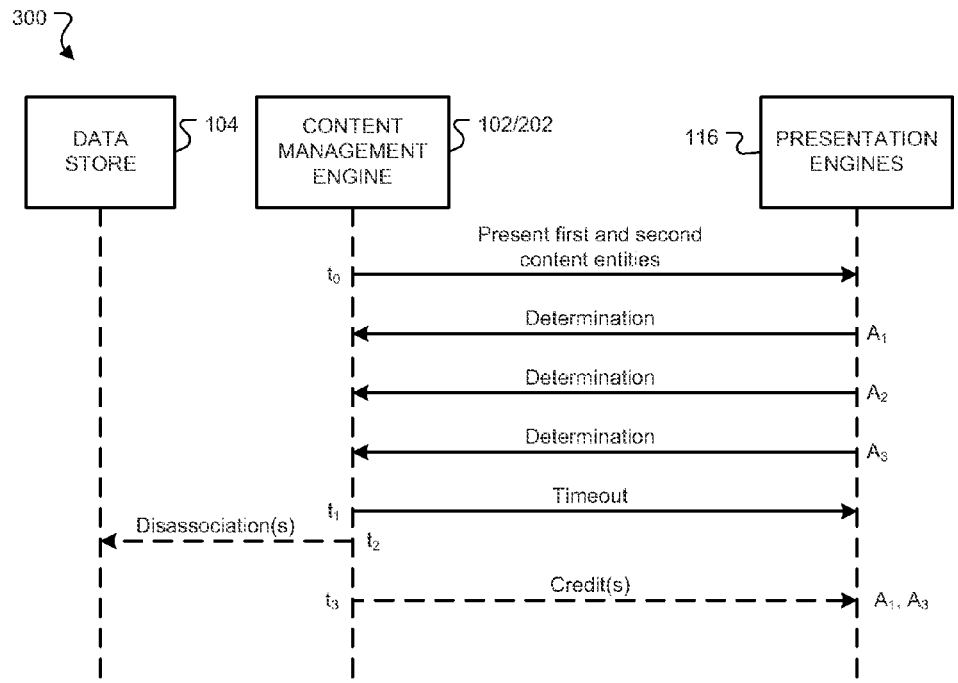
FIG. 3 is a timing diagram of a content management process.

FIG. 3 is a timing diagram of a content management process 300. The content management process 300 can, for example, be performed by the content management engine 102 or the content management engine 202.

The process 300 starts at $t_0$ when the content management engine 102 or the content management engine 202 presents first and second content entities to the presentation engines 116. In this example, the presentation engines 116 present the content entities to three arbiters $A_1$, $A_2$, and $A_3$ substantially simultaneously. In one implementation, the content management engine 102 can set a time limit for the arbiters $A_1$, $A_2$, and $A_3$. In the depicted example, the content management engine 102 or the content management engine 202 sets a timeout time of $t_1$, and the arbiters $A_1$, $A_2$, and $A_3$ provide respective determinations before the timeout.

After $t_1$, the content management engine 102 or the content management engine 202 can determine which, if any, of the second content entities 110 are to be disassociated. At $t_2$, the content management engine 102 or the content management engine 202 can optionally send one or more disassociation commands to the data store 104. For example, if the second content entity 118 is determined to be disassociated, then the content management engine 102 or the content management engine 202 can transmit a disassociation command to the data store to disassociate the second content 118 from a first content entity 108.

At time $t_3$, the content management engine 102 or the content management engine 202 can award credits to some or all of the arbiters. In one implementation, the content management engine may award credits based on the determinations received from the arbiter. For example, the content management engine may award credits to an arbiter if a received determination from the arbiter indicates the content entity that is eventually determined to be disassociated. For example, the arbiters $A_1$ and $A_3$ selected the same second content entity for disassociation, while the arbiter $A_2$ selected a different second content entity for disassociation. Accordingly, the second content entity is disassociated based on a majority vote, and thus the accounts for the arbiters $A_1$ and $A_3$ are credited.

Figure 4:
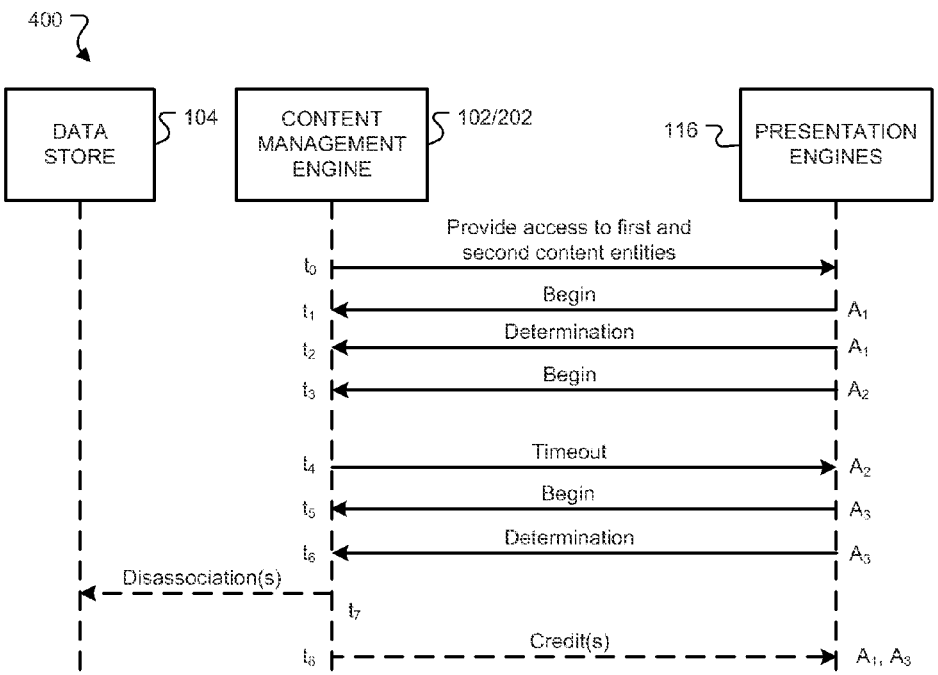
FIG. 4 is a timing diagram of another content management process.

FIG. 4 is a timing diagram of another content management process 400. The content management process 400 can, for example, be performed by the content management engine 102 or the content management engine 202. In the content management process 400, the content management engine 102 or the content management engine 202 can present content entities and receive determinations at different times from the arbiters. In an implementation, the content management engine 102 or the content management engine 202 can present content entities and set different time limits for each of the arbiters. Determinations received from the arbiters can be buffered until a predetermined number of determinations are received.

The content management engine 102 or the content management engine 202 provides access to the first and second content entities at time $t_0$, and the arbiters $A_1$, $A_2$, and $A_3$ begin their corresponding review processes at different times. For example, the arbiter $A_1$ begins the reviewing process at $t_1$, the arbiter $A_2$ begins the review process at $t_3$, and the arbiter $A_3$ begins the review process at $t_5$. In an implementation, the content management engine 102 or the content management engine 202 can set a time limit based on start times of each of the arbiters $A_1$, $A_2$, and $A_3$. For example, the content management engine 102 or the content management engine 202 can set a time limit by adding a fixed duration, e.g., 30 seconds, 1 minute, or some other time duration, to a start time of the review process. In this example, the arbiters $A_1$ and $A_3$ provide determinations before timeouts, but the arbiter $A_2$ does not provide a determination before the timeout time $t_4$.

The content management engine 102 or the content management engine 202 can, for example, buffer the determinations until a predetermined number of determinations are received. In the example of FIG. 4, a predetermined number of determinations are received at the time $t_6$, e.g., two determinations for the same second content entity to be disassociated, the first determination from $A_1$ and the second determination $A_3$. Thus, at time $t_7$, a disassociation command is sent to the data store, and at time $t_8$, credits are awarded to the accounts of arbiters $A_1$ and $A_3$.

Figure 5:
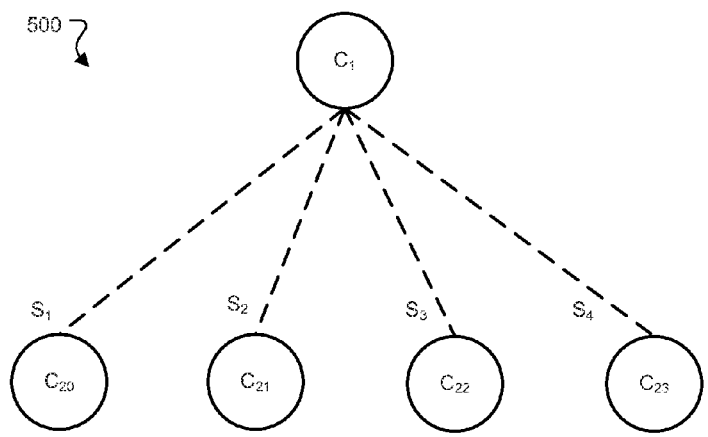
FIG. 5 is a block diagram of an association of a first content entity and second content entities.

FIG. 5 is a block diagram of an association 500 of a first content entity $C_1$ and second content entities $C_{20}$, $C_{21}$, $C_{22}$, and $C_{23}$. For example, the first content entity $C_1$ may be an article related to cars and the second content entities $C_{20}$, $C_{21}$, $C_{22}$, and $C_{23}$ maybe user comments associated with the article. The second content entities $C_{20}$, $C_{21}$, and $C_{22}$ may be relevant comments or Uniform Resource Locators (URLs) that are related to the automobile. However, the second content entity $C_{23}$ may be, for example, a URL of a real estate marketing web site. Accordingly, the association scores $S_1$, $S_2$, and $S_3$ may be relatively high, while the association score $S_4$ may be relatively low.

Figure 6:
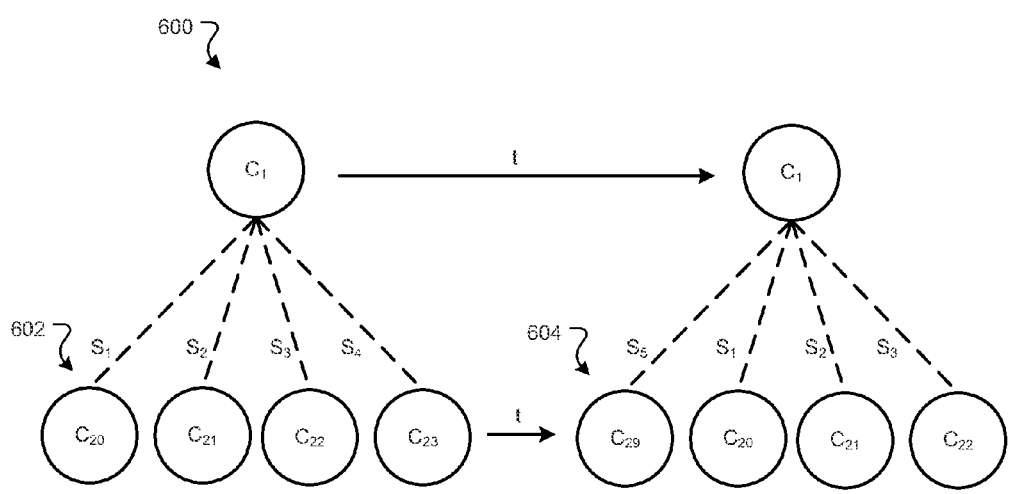
FIG. 6 is a timing diagram of association phenomena of a first content entity and second content entities.

FIG. 6 is a timing diagram of association phenomena 600 of a first content entity and second content entities. An association 602 is changed to an association 604 at time t. In one example, the associations 602 and 604 may be associations of a search query and corresponding search results. For example, a first content entity $C_1$ may be a search query and the second content entities $C_{20}$, $C_{21}$, $C_{22}$, and $C_{23}$ in the association 602 can define the top-ranked search result content entities before the time t. Likewise, the second content entities and $C_{20}$, $C_{21}$, $C_{22}$, and $C_{29}$ in the association 604 can define the top-ranked search result content entities for the search query $C_1$ after the time t.

In one implementation, the content management engine 202 can assign association scores related to rank freshness to each of the second content entities $C_{20}$, $C_{21}$, $C_{22}$, $C_{23}$, and $C_{29}$ in the associations 602 and 604. For example, the respective association scores $S_1$, $S_2$, $S_3$, $S_4$ and $S_5$ can have magnitudes in substantially inverse proportion to the ranking freshness of each of the corresponding second content entities $C_{20}$, $C_{21}$, $C_{22}$, $C_{23}$, and $C_{29}$. Thus, if the second content entity $C_{29}$ achieves the highest search result rank in a relatively short time period, the association score $S_5$ of the second content entity $C_{29}$ can be assigned a relatively low value.

Figure 7:
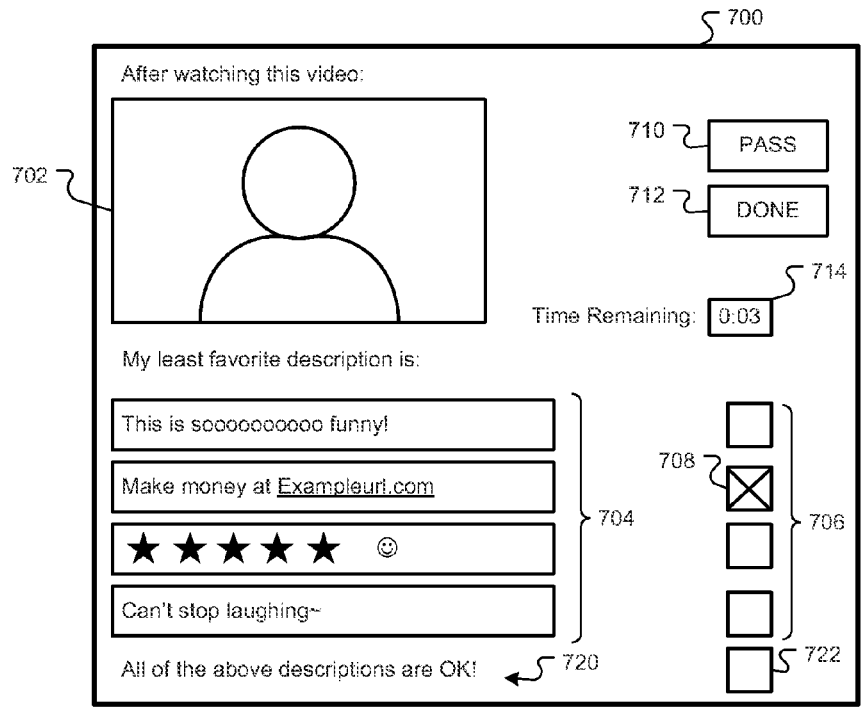
FIG. 7 is a screenshot of an example content management environment.

FIG. 7 is a screenshot of an example content management environment 700. The content management environment 700 can, for example, be displayed by the presentation engine 116. The content management environment 700 presents a first content entity, e.g., a video 702, and four associated second content entities, e.g., user comments 704. The environment 700 also includes check boxes 706 associated with each of the user comments 704.

An arbiter, e.g., a user, can view the video 702 and read the comments 704. In some implementations, the arbiter can select one or more of the comments 704 to be disassociated from the video 702 by selecting the corresponding check boxes 706. For example, suppose the video 702 shown is a humorous video. The arbiter may determine that the second user comment "Make money at Exampleurl.com" is not a relevant comment for the video 702 and thus select the second user comment to be disassociated, as indicated by the selected check box 708.

The content management environment 700 can, for example, include a pass button 710 and a done button 712. In an implementation, the arbiter can select the pass button 710 if the arbiter cannot decide which second content entity to select, or the arbiter can select the done button 712 after selecting second content entity to be disassociated. In one implementation, the content management environment 700 may generate an arbiter determination indicating the arbiter selection upon selection of the done button.

In one implementation, the arbiter can be required to make a determination within a time limit, and thus the content management environment 700 includes a time remaining display 714. The time remaining display 714 may decrement to countdown a time period. As shown in FIG. 7, the arbiter has three more seconds to make a determination.

The content management environment 700 can, for example, also include a selection option 720 to indicate that the associated entities 704 each appear to be relevant to the first content entity 702. A corresponding check box 722 can, for example be selected if the arbiter determines that none of the second content entities need be disassociated from the first content entity.

In one implementation, the content management environment 700 may be displayed at substantially simultaneous times at the client devices 114 of arbiters. For example, the arbiters may determine any of the user comments 704 of the video 702 is to be disassociated during substantially the same time period.

In another implementation, the content management environment 700 may be displayed at substantially different time periods at the client devices 114 of arbiters. For example, each of the arbiters may make determinations at different times, and the determinations can be buffered until a predetermined number of arbiter determinations are received.

Figure 8:
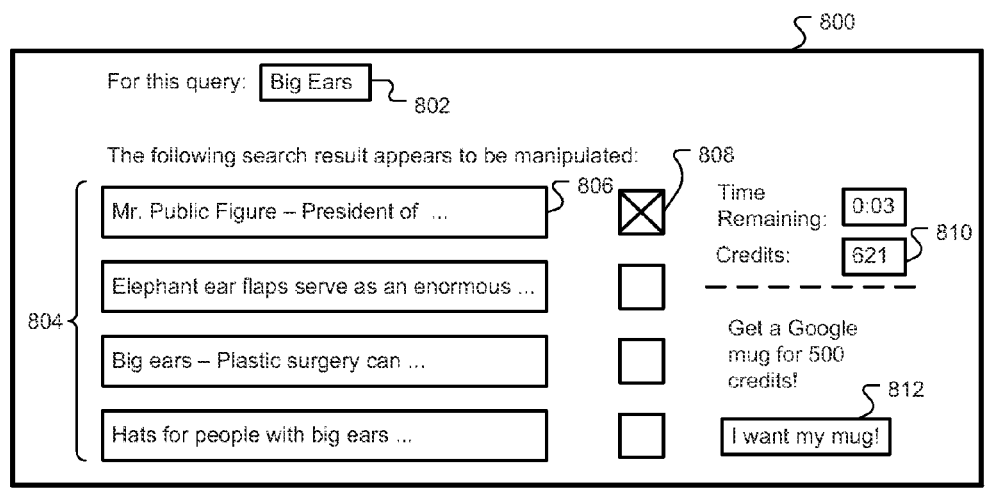
FIG. 8 is a screenshot of another example content management environment.

FIG. 8 is a screenshot of another example content management environment 800. The content management environment 800 displays a first content entity search query 802 and second content entity search results 804 for the search query 802. The arbiters can, for example, utilize the content management environment 800 to identify a search result that appears to be manipulated. For example, the arbiter may determine that the search result 806 of Mr. Public Figure appears to be manipulated, as it does not readily appear relevant, or appears least relevant, to the search query "Big Ears." Accordingly, the arbiter can select a check box 808 of the search result 806 to indicate a determination that the search result 806 should be disassociated from the search query 802.

The example content management environment 800 includes a credit display 810 displaying the credits in the arbiter's account. In an implementation, the arbiter account can receive credits if the arbiter selects a search result that is actually determined to be removed by the system. Thus, if the arbiter's determination results in the disassociation of the search result 806 from the search query 802, credits can be awarded to the arbiter's account.

In one implementation, the content management environment 800 can offer rewards that can be redeemed with the credits. For example, the arbiter can receive a coffee mug by redeeming 500 credits by selecting a redeem button 812. Other rewards can also be offered. For example, the arbiters may use the credits to redeem online storage for email, images, or video. In another example, implementation, the content management environment 800 can include a link to a shopping website that the arbiter can use the credits to redeem different products, such as songs, DVDs, etc. Other credits including cash or other compensation are possible.

In another implementation, an arbiter can assign values to one or more second content entities, such as a relevance score, e.g., a score ranging from 0 to 5, in which 0 indicates an entirely irrelevant second content entity and 5 indicates a very relevant second content entity. For example, the content management environment 700 can include numerical fields instead of the check boxes 706. An arbiter can thus provide a subjective score based on the arbiter's determination of the relevance of a corresponding second content item to the first content item 702.

In another implementation, a series of questions can be presented to an arbiter, e.g., "Is the comment interesting?," "Is the comment offensive?," "Does this comment appear to be a spam link?" etc. Based on the arbiter answers, the content management engine 102 or the content management engine 202 can, for example, determine whether one or more second content entities are to be disassociated with a first content entity item.

Figure 9:
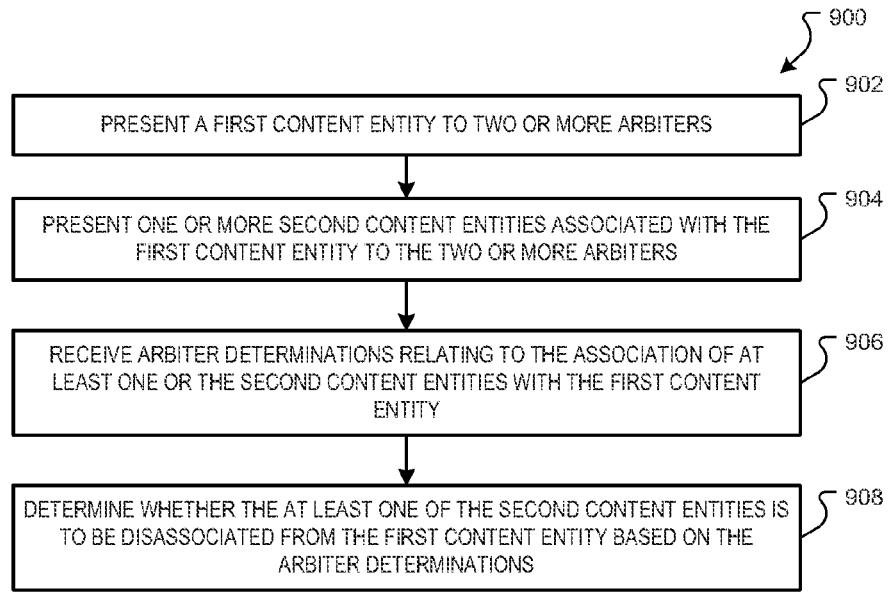
FIG. 9 is a flow diagram of an example process for managing content entities.

FIG. 9 is a flow diagram of an example process 900 for managing content entities. The process 900 can, for example, be implemented in a system such as the content management system 100 of FIG. 1 and/or the content management system 200 of FIG. 2.

Stage 902 presents a first content entity to two or more arbiters. For example, the content management engine 102 or the content management engine 202 may present the first content entity 108 to two or more arbiters through the client devices 114.

Stage 904 presents one or more second content entities associated with the first content entity to the two or more arbiters. For example, the content management engine 102 or the content management engine 202 may present one or more of the second content entities 110 to the client devices 114.

Stage 906 receives arbiter determinations relating to the association of at least one or the second content entities with the first content entity. For example, the content management engine 102 or the content management engine 202 may receive arbiter determinations from the client devices 114. The arbiter determinations may include determinations of whether to disassociate any of the second content entities 110 from the first content entity 108.

Stage 908 determines whether the at least one of the second content entities is to be disassociated from the first content entity based on the arbiter determinations. For example, the content management engine 102 or the content management engine 202 can determine whether any of the second content entities 110 is to be disassociated based on the arbiter determination. For example, if a majority of the arbiter determinations indicating a disassociation of at least one of the second content entities 110, then the at least one of the second content entities 110 is to be disassociated.

Figure 10:
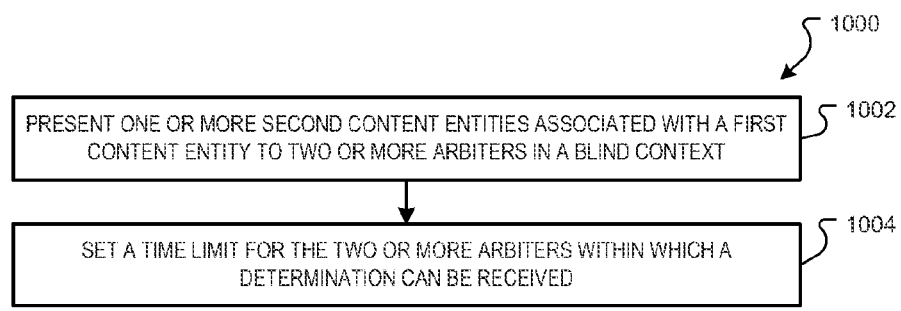
FIG. 10 is a flow diagram of an example process for managing content entities in a blind context.

FIG. 10 is a flow diagram of an example process 1000 for managing content entities in a blind context. The process 1000 can, for example, be implemented in a system such as the content management system 100 of FIG. 1 and/or the content management system 200 of FIG. 2.

Stage 1002 presents one or more second content entities associated with a first content entity to two or more arbiters in a blind context. For example, the content management engine 102 or the content management engine 202 can randomly select two or more arbiters to present the second content entities 110 and the first content entity 108. Each arbiter may not have knowledge of the identity of the other arbiters or the other arbiter determinations.

Stage 1004 sets a time limit for the two or more arbiters within which a determination can be received. For example, the content management engine 102 or the content management engine 202 can set a time limit within which the arbiters can return arbiter determinations to the system 100.

Figure 11:
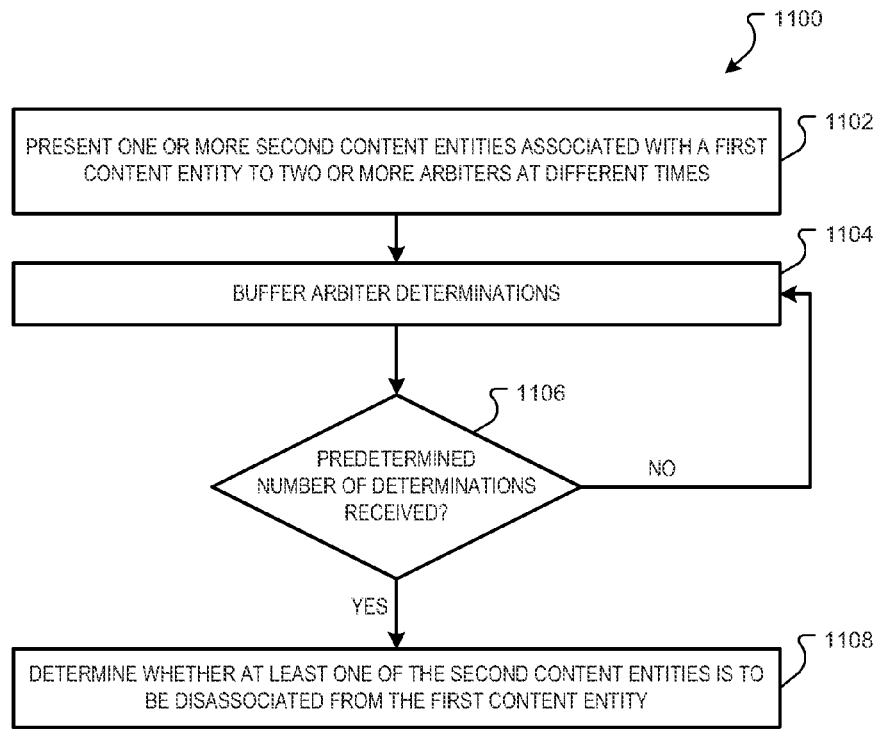
FIG. 11 is a flow diagram of an example process for managing content entities asynchronously.

FIG. 11 is a flow diagram of an example process 1100 for managing content entities asynchronously. The process 1100 can, for example, be implemented in a system such as the content management system 100 of FIG. 1 and/or the content management system 200 of FIG. 2.

Stage 1102 presents one or more second content entities associated with a first content entity to two or more arbiters at different times. For example, the content management engine 102 or the content management engine 202 can present one or more of the second content entities associated with the first content entity to two arbiters $A_1$ and $A_2$ at times $t_1$ and $t_3$, respectively, as shown in FIG. 4.

Stage 1104 buffers arbiter determinations. For example, as shown in FIG. 4, the content management engine 102 or the content management engine 202 can buffer arbiter determinations as the determinations are received at times $t_2$ and $t_6$.

Stage 1106 determines whether a predetermined number of determinations are received. For example, the content management engine 102 or the content management engine 202 may determine whether two determinations are received.

If the predetermined number of determinations are not received, then the stage 1104 is repeated. For example, the content management engine 102 or the content management engine 202 may continue to receive arbiter determinations from times $t_2$ to $t_6$, as shown in FIG. 4.

If the predetermined number of determinations are received, then stage 1108 determines whether at least one of the second content entities is to be disassociated from the first content entity. For example, the content management engine 102 or the content management engine 202 can determine whether at least one of the second content entities 110 is to be disassociated based on whether a majority of the reviewed determinations indicating that at least one of the second content entities 110 is to be disassociated.

Figure 12:
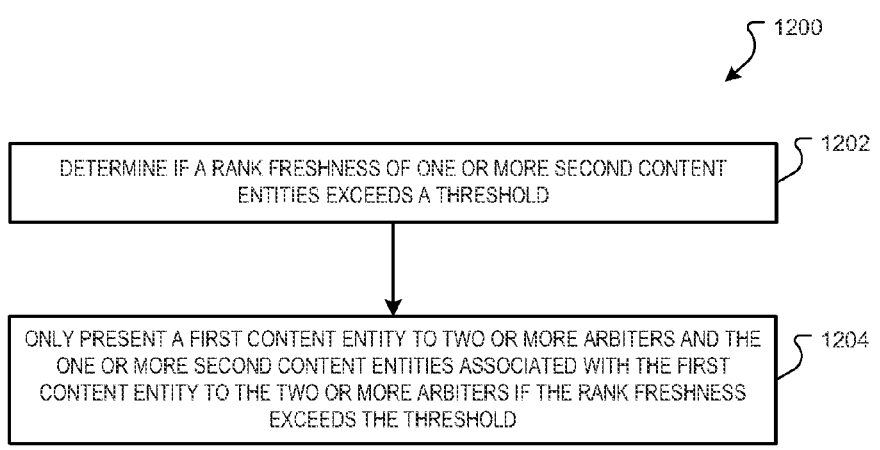
FIG. 12 is a flow diagram of an example process for managing content entities based on an association phenomenon.

FIG. 12 is a flow diagram of an example process 1200 for managing content entities based on an association phenomenon, e.g., rank freshness. The process 1200 can, for example, be implemented in a system such as the content management system 200 of FIG. 2.

Stage 1202 determines if a rank freshness of one or more second content entities exceeds a threshold. For example, the content management engine 202 can determine whether any of the second content entities 110 has a rank freshness that exceeds a threshold by accessing the association scores 204.

Stage 1204 only presents a first content entity to two or more arbiters and the one or more second content entities associated with a first content entity to the two or more arbiters if the rank freshness exceeds the threshold. For example, the content management engine 202 may be configured to present the second content entities 110 associated with the first content entity 108 that have a freshness that exceeds a reference threshold.

Figure 13:
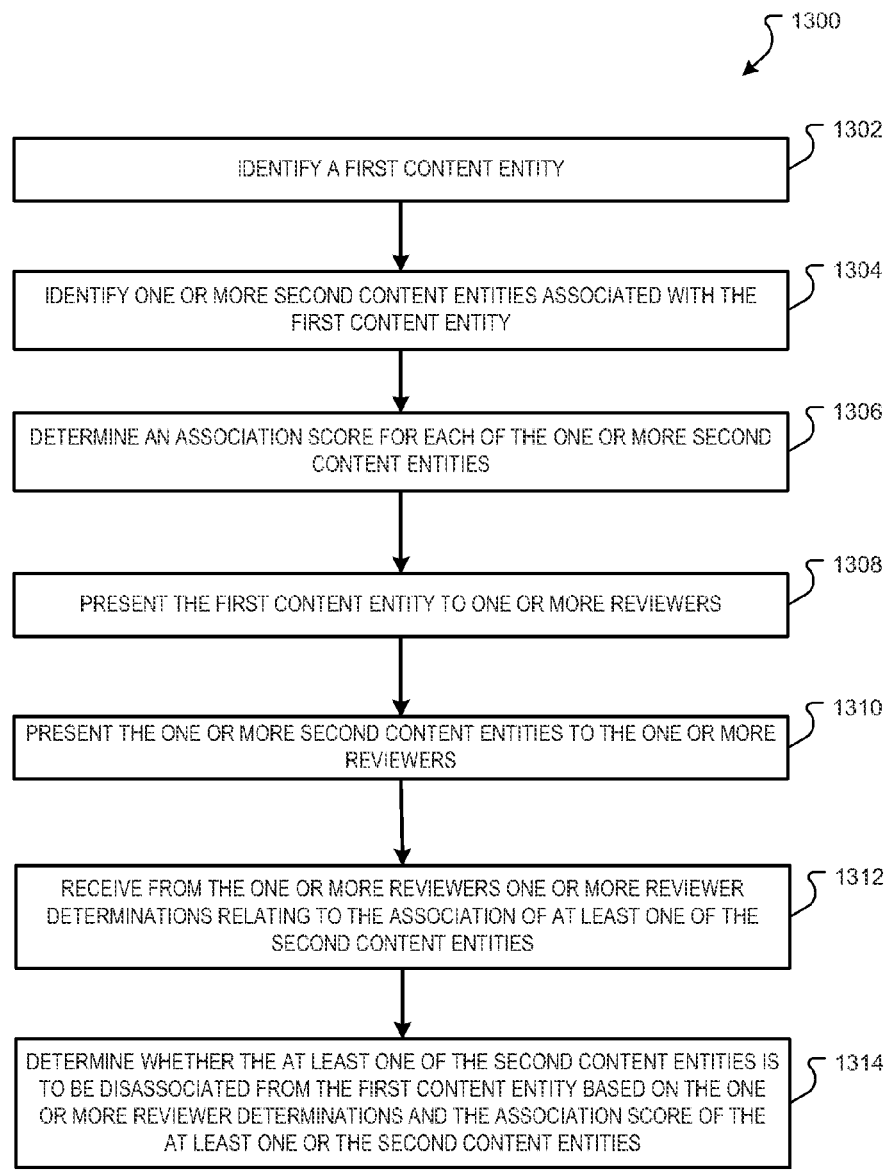
FIG. 13 is a flow diagram of another example process for managing content entities.

FIG. 13 is a flow diagram of another example process 1300 for managing content entities. The process 1300 can, for example, be implemented in a system such as the content management system 200 of FIG. 2.

Stage 1302 identifies a first content entity. For example, the content management engine 202 can identify the first content entity 108 from the data store 104.

Stage 1304 identifies one or more second content entities associated with the first content entity. For example, the content management engine 202 can identify the second content entities 110 associated with the first content entity 108.

Stage 1306 determines an association score for each of the one or more second content entities. For example, the content management engine 202 can determine the association score 204 for each of the second content entities 110.

Stage 1308 presents the first content entity to one or more reviewers. For example, the content management engine 202 can present the first content entity 108 to one or more reviewers through the client devices 114, e.g., by implementing the content management environment 700 or 800.

Stage 1310 presents the one or more second content entities to the one or more reviewers. For example, the content management engine 202 can present the first content entity 108 to one or more reviewers through the client devices 114, e.g., by implementing the content management environment 700 or 800.

Stage 1312 receives from the one or more reviewers one or more reviewer determinations relating to the association of at least one of the second content entities with the first content entity. For example, the content management engine 202 can receive, from the two or more reviewers, determinations related to whether any of the presented second content entities 110 is to be disassociated. Other disassociation determination algorithms can also be used.

Stage 1314 determines whether the at least one of the second content entities is to be disassociated from the first content entity based on the one or more reviewer determinations and the association score of the at least one of the second content entities. For example, the content management engine 202 can determine, based on the received determination and the association scores 204, whether any of the second content entities 110 is to be disassociated. For example, in one implementation, the content management engine 202 may determine that the second content entity 118 is to be disassociated only if the corresponding association score 204 of the second content entity 118 is less than a threshold and a majority of the determinations indicate that the second content entity 118 is to be disassociated. In another implementation, the content management engine 202 can determine that the second content entity 118 is to be disassociated if either the corresponding association score 204 of the second content entity 118 is less than the threshold or a majority of the determinations indicate that the second content entity 118 is to be disassociated.

Figure 14:
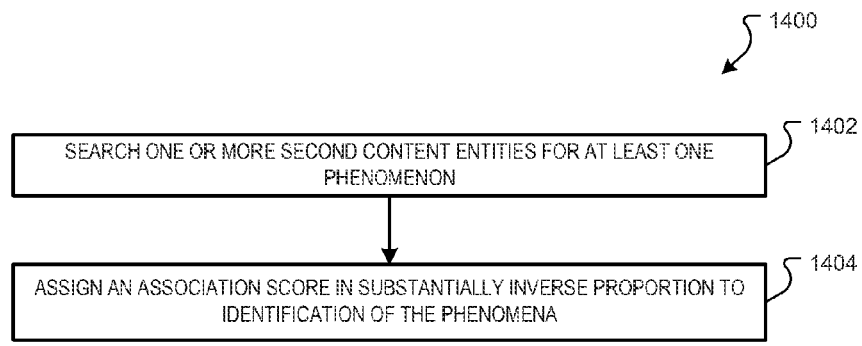
FIG. 14 is a flow diagram of an example process for determining association scores.

FIG. 14 is a flow diagram of an example process 1400 for determining association scores. The process 1400 can, for example, be implemented in a system such as the content management system 200 of FIG. 2.

Stage 1402 searches one or more second content entities for at least one phenomenon. For example, the content management engine 202 can search the second content entities 110 for one or more phenomena, such as predetermined textual patterns, a high ranking freshness, and/or a predetermined URL, etc.

Stage 1404 assigns an association score in substantially inverse proportion to identification of the phenomena. For example, the content management engine 202 may assign an association score 204 to each of the second content entities 110. The association scores 204 can, for example, be of a magnitude that is in substantially inverse proportion to the number of phenomenon identified in the corresponding second content entity. For example, if the content management engine 202 identifies a predetermined URL and several predetermined textual patterns in the second content entity 118, then the content management engine 202 may assign a substantially lower association score to the second content entity 118 than would be assigned if only one predetermined textual pattern was identified.

Figure 15:
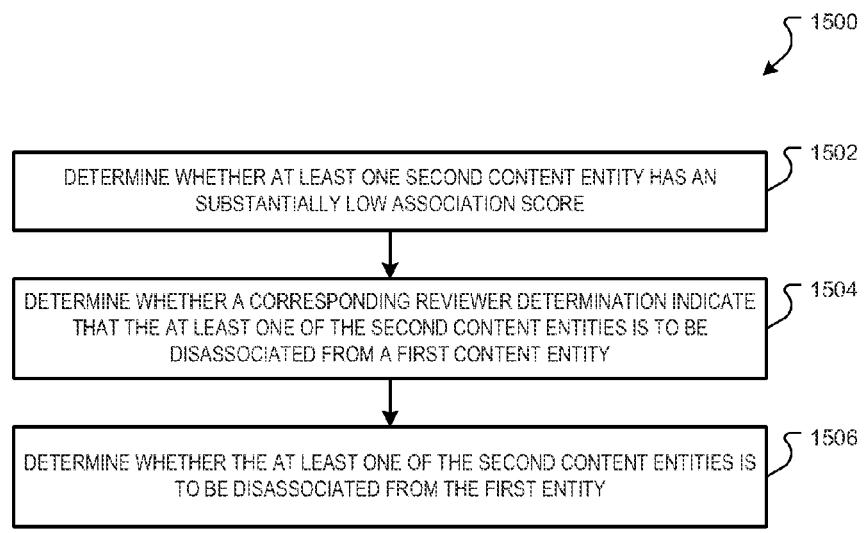
FIG. 15 is a flow diagram of an example process for managing content entities based on association scores and reviewer determinations.

FIG. 15 is a flow diagram of an example process 1500 for managing content entities based on association scores and reviewer determinations. The process 1500 can, for example, be implemented in a system such as the content management system 200 of FIG. 2.

Stage 1502 determines whether at least one second content entity has a substantially low association score. For example, the content management engine 202 can access the association scores 204 to determine which of the second content entities 110 has a substantially low association score.

Stage 1504 determines whether a corresponding reviewer determination indicates that the at least one of the second content entities is to be disassociated from a first content entity. For example, the content management engine 202 can receive a reviewer determination from one of the client devices 114 related to whether any of the second content entities 110, which have substantially low association scores, is to be disassociated from the first content entity 108.

Stage 1506 determines whether the at least one of the second content entities is to be disassociated form the first entity. For example, if a majority of the reviewer determinations indicate that at least one of the second content entities 110, which have a substantially low association score, is to be disassociated, then the content management engine 202 can determine that the at least one second content entities is to be disassociated.

Figure 16:
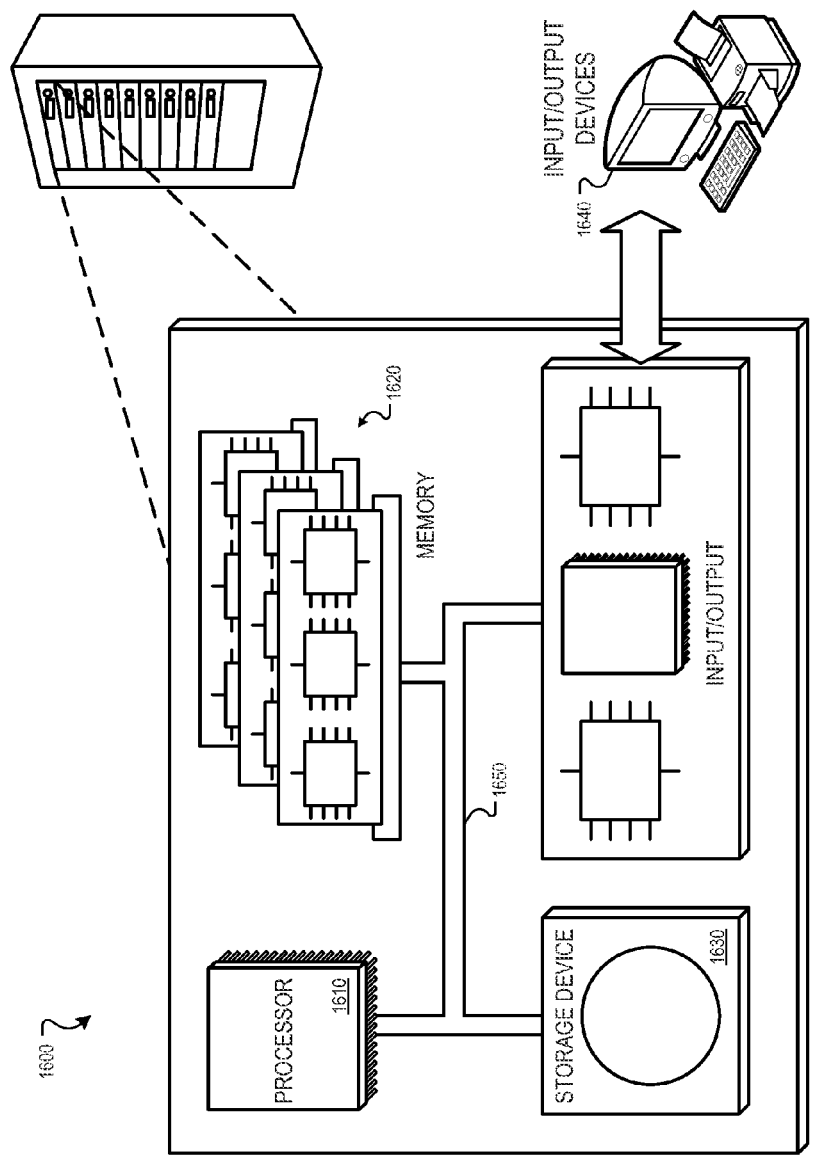
FIG. 16 is a schematic diagram of an example computer system that can be utilized to implement the systems and methods described herein.

FIG. 16 is a schematic diagram of an example computer system 1600 that can be utilized to implement the systems and methods described herein. One or more of the systems 1600 can be utilized to perform for the operations described in association with the methods 900, 1000, 1100, 1200, 1300 1400 and 1500, according to one or more implementations. For example, one or more of the systems 1600 can be utilized to implement a server hosting the content management system 100 or 200; alternatively, one or more of the systems can be utilized to implement a client device communicating with the content management system 100 or 200.

The system 1600 includes a processor 1610, a memory 1620, a storage device 1630, and an input/output device 1640. Each of the components 1610, 1620, 1630, and 1640 can, for example, be interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit.

The storage device 1630 is capable of providing mass storage for the system 1600. In one implementation, the storage device 1630 is a computer-readable medium. In various different implementations, the storage device 1630 can, for example, include a hard disk device, an optical disk device, or some other large capacity storage device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, the method comprising:

identifying one or more second content entities associated with a first content entity wherein each of the second content entities has a respective association score that is based on a measure of a recent change in a search result rank of the second content entity, and wherein the measure of the recent change in the search result rank of the second content entity exceeds a rank threshold;

providing the first content entity and one or more of the second content entities associated with the first content entity for presentation to a plurality of arbiters;

receiving determinations from a plurality of the arbiters within a predetermined time limit period, wherein each determination indicates an association determination of a respective arbiter of the plurality of arbiters for a second content entity of the one or more second content entities and the first content entity;

determining that a second content entity is to be disassociated from the first content entity based on, at least, the received determinations by determining that a number of the received determinations that each indicate an association determination to disassociate the second content entity from the first content entity is in proportion to the respective association score for the second content entity; and crediting one or more of the plurality of arbiters for which a determination to disassociate the second content entity from the first content entity was received.

2. The method of claim 1 wherein providing the one or more second content entities further comprises providing the second content entities having respective association scores that satisfy a threshold.

3. The method of claim 1 wherein the respective association score is in substantially inverse proportion to the measure of the recent change in the search result rank of the second content entity.

4. The method of claim 1 wherein the respective association score is based on, at least, a number of phenomena in the second content entity, wherein a phenomenon is one of a text pattern, a profane word or phrase, or a uniform resource locator.

5. The method of claim 1 wherein the association determination is a determination to dissociate the second content entity of the one or more second content entities and the first content entity.

6. The method of claim 1, wherein the association determination is a determination not to disassociate the second content entity of the one or more second content entities and the first content entity.

7. The method of claim 1 wherein determining that the second content entity is to be disassociated from the first content entity further comprises determining that a majority of the association determinations indicate that the second content entity is to be disassociated from the first content entity.

8. The method of claim 1 wherein providing the first content entity and the one or more second content entities associated with the first content entity for presentation to the plurality of arbiters further comprises providing the first content entity and the one or more second content entities to the plurality of arbiters at different times.

9. The method of claim 1 wherein the first content entity is a web page, video content, audio content, an online journal entry, a blog post, a news article, an item offered for sale in an online store, a search query, or text.

10. The method of claim 1 wherein the second content entity is a rating, a review, a tag, a comment, an annotation, a link to a web page, or a collection of search results based on a search query.

11. A system comprising:
one or more processors programmed to perform operations comprising:
identifying one or more second content entities associated with a first content entity wherein each of the second content entities has a respective association score that is based on a measure of a recent change in a search result rank of the second content entity, and wherein the measure of the recent change in the search result rank of the second content entity exceeds a rank threshold;
providing the first content entity and one or more of the second content entities associated with the first content entity for presentation to a plurality of arbiters;
receiving determinations from a plurality of the arbiters within a predetermined time limit period, wherein each determination indicates an association determination of a respective arbiter of the plurality of arbiters for a second content entity of the one or more second content entities and the first content entity;
determining that a second content entity is to be disassociated from the first content entity based on, at least, the received determinations by determining thin a number of the received determinations that each indicate an association determination to disassociate the second content entity from the first content entity is in proportion to the respective association score for the second content entity; and
crediting one or more of the plurality of arbiters for which a determination to disassociate the second content entity from the first content entity was received.

12. The system of claim 11 wherein the association determination is a determination to dissociate the second content entity of the one or more second content entities and the first content entity.

13. The system of claim 11, wherein the association determination is a determination not to disassociate the second content entity of the one or more second content entities and the first content entity.

14. The system of claim 11 wherein the first content entity is a web page, video content, audio content, an online journal entry, a blog post, a news article, an item offered for sale in an online store, a search query, or text.

15. The system of claim 11 wherein the second content entity is a rating, a review, a tag, a comment, an annotation, a link to a web page, or a collection of search results based on a search query.

16. A non-transitory computer-readable medium having instructions stored thereon that, when executed by one or more processors, causes the one or more processors to perform operations comprising:
identifying one or more second content entities associated with a first content entity wherein each of the second content entities has a respective association score that is based on a measure of a recent change in a search result rank of the second content entity, and wherein the measure of the recent change in the search result rank of the second content entity exceeds a rank threshold;
providing the first content entity and one or more of the second content entities associated with the first content entity for presentation to a plurality of arbiters;
receiving determinations from a plurality of the arbiters within a predetermined time limit period, wherein each determination indicates an association determination of a respective arbiter of the plurality of arbiters for a second content entity of the one or more second content entities and the first content entity;
determining that a second content entity is to be disassociated from the first content entity based on, at least, the received determinations by determining that a number of the received determinations that each indicate an association determination to disassociate the second content entity from the first content entity is in proportion to the respective association score for the second content entity; and
crediting one or more of the plurality of arbiters for which a determination to disassociate the second content entity from the first content entity was received.

* * * * *

UNITED STATES PATENT AND TRADEMARK OFFICE
CERTIFICATE OF CORRECTION

| | |
|---|---|
| PATENT NO. | : 8,612,460 B1 |
| APPLICATION NO. | : 13/465963 |
| DATED | : December 17, 2013 |
| INVENTOR(S) | : Mayur Dhondu Datar et al. |

It is certified that error appears in the above-identified patent and that said Letters Patent is hereby corrected as shown below:

In the Claims

In Claim 11, column 17, line 40, delete "thin" and insert -- than --.

Signed and Sealed this
Fifteenth Day of April, 2014

Michelle K. Lee
*Deputy Director of the United States Patent and Trademark Office*